(12) United States Patent
Bischoff et al.

(10) Patent No.: US 11,370,403 B2
(45) Date of Patent: Jun. 28, 2022

(54) UNIT HAVING AT LEAST ONE PISTON WITH AN ASSOCIATED PISTON SPRING

(71) Applicant: Continental Teves AG & Co. OHG, Frankfurt am Main (DE)

(72) Inventors: Andreas Bischoff, Frankfurt am Main (DE); Horst Krämer, Ginsheim-Gustavsburg (DE); Manfred Rüffer, Sulzbach (DE); Jörg Loke, Brechen (DE); Sascha Gerber, Bad Schwalbach (DE); Ingo Knewitz, Neu Anspach (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 24 days.

(21) Appl. No.: 16/903,639

(22) Filed: Jun. 17, 2020

(65) Prior Publication Data
US 2020/0307535 A1    Oct. 1, 2020

Related U.S. Application Data

(63) Continuation of application No. PCT/EP2018/078718, filed on Oct. 19, 2018.

(30) Foreign Application Priority Data

Dec. 22, 2017   (DE) ..................... 10 2017 223 678.7

(51) Int. Cl.
*B60T 11/20* (2006.01)
*F15B 15/14* (2006.01)
*F16D 65/00* (2006.01)

(52) U.S. Cl.
CPC .......... *B60T 11/20* (2013.01); *F16D 65/0043* (2013.01); *F15B 15/1447* (2013.01); *F15B 2215/30* (2013.01); *F16D 2250/0084* (2013.01)

(58) Field of Classification Search
CPC ........ B60T 11/20; B60T 11/165; B60T 11/16; F15B 15/1476; F15B 2215/30
(Continued)

(56) References Cited

U.S. PATENT DOCUMENTS 5,829,896 A    11/1998  Cain, Jr.
2013/0213033 A1   8/2013  Konig
(Continued)

FOREIGN PATENT DOCUMENTS

CN    203272548 U    11/2013
CN    103089866 B     8/2015
(Continued)

OTHER PUBLICATIONS

Search Report dated Nov. 28, 2018 from corresponding German Patent Application No. 10 2017 223 678.6.
(Continued)

*Primary Examiner* — Michael Leslie
*Assistant Examiner* — Daniel S Collins

(57) ABSTRACT

An apparatus having a housing, a cavity which is disposed in the housing and which at least in regions is configured as a bore in which at least one piston and one piston spring associated with the piston are received, wherein the piston spring in the bore when activating the piston in the operation of the apparatus is compressed by the piston. The piston spring is configured from a magnetic or magnetizable material, the piston is configured from a non-magnetic material, and an assembly unit which comprises the piston having the piston spring is provided, and in which the piston spring is held on the piston by a magnetic field.

17 Claims, 2 Drawing Sheets

(58) Field of Classification Search
USPC .......................................... 92/130 R, 130 D
See application file for complete search history.

(56) References Cited

U.S. PATENT DOCUMENTS

| | | |
|---|---|---|
| 2015/0033839 A1 | 2/2015 | Voigtmann et al. |
| 2016/0137180 A1 | 5/2016 | Rodriguez et al. |
| 2017/0133139 A1 | 5/2017 | Hegenbart et al. |

FOREIGN PATENT DOCUMENTS

| | | |
|---|---|---|
| DE | 19830386 C1 | 12/1999 |
| DE | 102008032694 A1 | 1/2010 |
| DE | 102012222547 A1 | 6/2013 |
| DE | 102015119434 A1 | 5/2017 |
| EP | 1132174 A1 | 9/2001 |
| GB | 2486051 A | 6/2012 |
| JP | S63232914 A | 9/1988 |
| JP | H05154722 A | 6/1993 |
| JP | 2000061860 A | 2/2000 |
| JP | 2005138671 A | 6/2005 |
| JP | 2009034780 A | 2/2009 |
| JP | 2013513525 A | 4/2013 |

OTHER PUBLICATIONS

International Search Report and Written Opinion dated Jan. 23, 2019 from corresponding International Patent Application No. PCT/EP2018/078718.

UNIT HAVING AT LEAST ONE PISTON WITH AN ASSOCIATED PISTON SPRING

CROSS-REFERENCE TO RELATED APPLICATIONS

This application claims priority to PCT International Application No. PCT/EP2018/078718, filed Oct. 19, 2018, which claims priority to German Patent Application No. DE 10 2017 223 678.7, filed Dec. 22, 2017, wherein the contents of such applications are incorporated herein by reference.

TECHNICAL BACKGROUND

Apparatuses having a piston which is capable of being axially repositioned in a bore and which is associated with a piston spring, in particular a restoring spring, are known and widely used in diverse design embodiments.

With a view to simplified and reliable assembling of the apparatus efforts are undertaken to form separate assembly units, or functional assemblies, respectively, which comprise in each case the piston spring having the associated piston, and to design the interface between the piston spring and the piston so as to be captively fixed.

For example, a tandem master brake cylinder having an aluminium housing for a motor vehicle brake system is known from DE 10 2012 222 547, in which tandem master brake cylinder the piston spring on the master piston is fastened by way of a sleeve which is displaceable on the piston and is captively fixed to the piston by way of a rivet connection on a mandrel on the piston. In the case of the slave piston, the piston spring at the piston end by way of the internal diameter thereof is permanently jammed on the piston by way of an interference fit on a centric pin. The fixed connection of the piston spring on the associated piston is maintained also in the operation of the apparatus.

It is considered disadvantageous herein that solutions of this type always require precise matching of the pairs of piston springs and pistons for different variants of the components, and on account thereof increase the diversity of parts required. The complexity for pre-assembling the assembly unit and the requirements in terms of the dimensional accuracy of the interface between the piston spring and the piston are increased. There is a risk of errors in assembling the piston spring in the pre-assembly which can be remedied only with great complexity, and of swarf being formed on account of the press-fitting or the riveting of the piston spring.

What is needed is an improved apparatus and a method by way of which the piston and the piston spring can be assembled in a more effective manner in the apparatus while avoiding the aforementioned disadvantages, and by way of which requirements in terms of the pre-assembly, the dimensional accuracy of the interface, as well as the diversity of parts when designing variants can potentially be reduced.

DETAILED DESCRIPTION OF THE EMBODIMENTS

Figure 1:
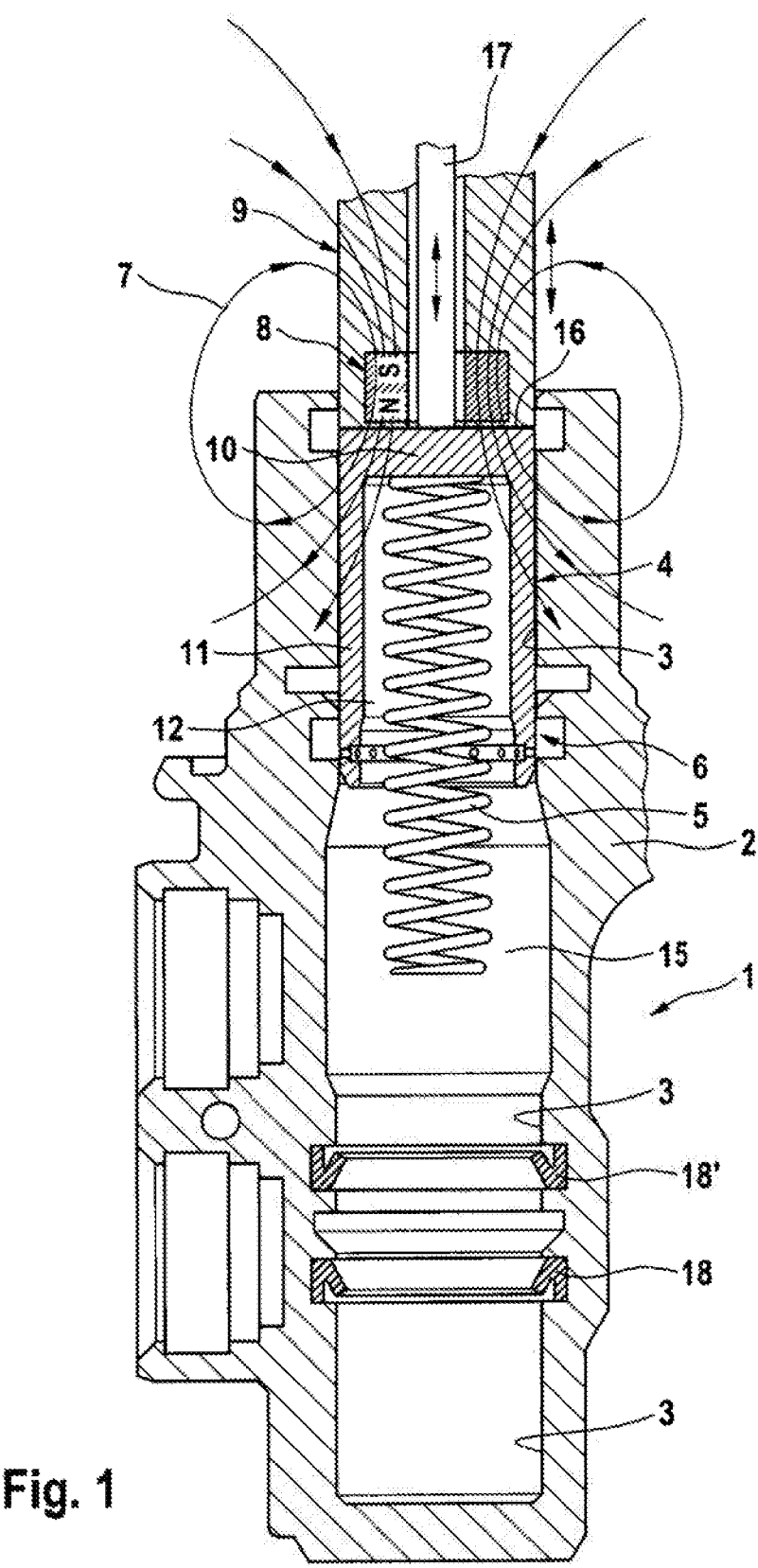
FIG. 1 in a partially highly simplified manner shows a first embodiment according to the invention in the axial section, and the assembly tool having a permanent magnet.

FIG. 1 in a sectional illustration shows an apparatus 1 which is not yet completely constructed, having a first embodiment of an assembly unit 3 and the assembly tool 7 when being introduced into the cavity 15 of the housing 2.

The apparatus 1 in the embodiment shown is configured in an exemplary manner as a master brake cylinder in a tandem construction for a hydraulic motor vehicle brake system.

The apparatus 1 comprises a housing 2 from a non-magnetic aluminium alloy. A pouch-shaped cavity 15 which in regions is designed as a bore 3 for guiding the piston 4 is provided in the housing 2. Sealing elements 18, 18' which are disposed in separate grooves of the bore 3 are provided for sliding in a sealing manner on the radial external face of the piston 4.

The piston 4 is composed substantially of a non-magnetic material, such as plastics material, light metals and/or light metal alloys.

The piston 4 is designed so as to be substantially sleeve-shaped and possesses a base 10 and a tubular wall 11 designed. The internal sides of the wall 11 and of the base 10 in the piston 4 thus delimit a piston interior space 12 in which a piston spring 5 is received in regions and loosely so as not to be jammed. The piston spring 5 serves as a restoring spring. Said piston spring is axially supported on the internal side of the base 10, is compressed in an activation of the piston 4, and at the end of the activation procedure repositions the piston 4 to the non-activated initial position thereof.

The piston spring 5 can be produced from a magnetic or magnetizable material, for example a ferromagnetic material such as spring steel, and thus reacts to a magnetic field.

For simplified assembling, the piston spring 5 is combined with the piston 4 so as to form an assembly unit 3. An assembly tool 9 serves for holding in place and introducing the assembly unit 3 into the cavity 15. To this end, a magnetic element 8 which generates a magnetic field 7 is disposed in the assembly tool 9.

The piston 5, by way of the external side of the base 10 of said piston 5, bears on an interface 16 on the assembly tool 9. The magnetic element 8 is situated in the immediate proximity of the base 10 of the piston 4. The magnetic field 7 penetrates the piston 4 and attracts the piston spring 5 to the magnetic element 8 such that the piston spring 5 is pressed against the internal side of the base 10 and is thus held in position in the assembly unit 3. The assembly unit 3 in this state, conjointly with the assembly tool 9, can be introduced into the cavity 15.

After the assembly unit 3 has been introduced to the provided position in the housing 2, the assembly tool 9 is separated from the piston 4 and guided out of the housing 2. When a permanent magnet is used as the magnetic element 8, a slide 7 which is capable of being axially repositioned relative to the assembly tool 9 can be used within the scope of the invention for separating the assembly tool 9, for example. The piston 4 is held in position by the slide 17 while the assembly tool 9 is returned, until the attraction force of the magnetic field 7 is no longer sufficient for holding in place the piston 4 on the assembly tool 9 by way of the contact pressure force of the piston spring 5 attracted by the magnetic field 7. In one or more embodiments, in the case of a suitable basic design of the magnetic field strength, the clamping force of the sealing elements 18, 18' can be utilized for holding in place the piston 4 within the housing 2 while the assembly tool 9 is extracted while overcoming the magnetic attraction force.

The magnetic element 8 in the embodiment shown is designed as an annular permanent magnet; other embodiments are however also permissible.

Figure 2:
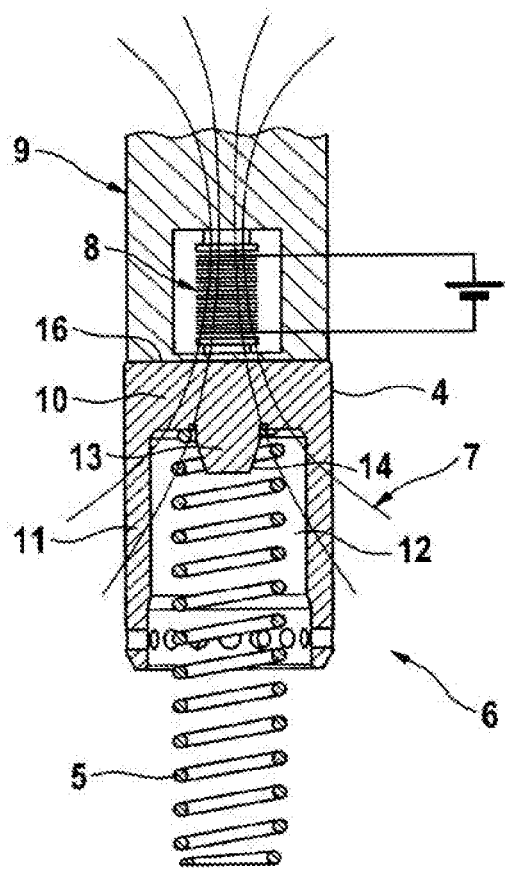
FIG. 2 shows another embodiment according to the invention of an assembly unit and an embodiment of the assembly tool having a solenoid.

A further embodiment of the assembly unit 3 is illustrated in FIG. 2. The magnetic element 8 here is configured as a solenoid, the magnetic field 7 thereof being present only in an activated state. The magnetic element 9 is activated when introducing the assembly unit 3 into the cavity 15, and for a simple extraction of the assembly tool 9 is deactivated upon reaching the desired position.

An appendage 13 which projects into the piston interior space 12 is provided on the internal side of the base 10 in the piston interior space 12. The appendage 12 has a conical external contour portion 14 on which the piston spring 5 can slide when being introduced, said piston spring 5 thus being aligned in a simple and positively centered manner and so as to be coaxial with the piston 4. At least one clearance fit is provided between the piston spring 5 and the appendage 12 so as to avoid jamming and/or canting of the piston spring 5.

Figure 3:
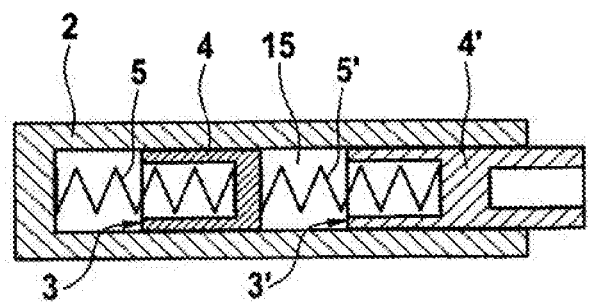
FIG. 3 shows a highly simplified illustration of a master brake cylinder in a tandem construction, comprising two assembly units according to one or more embodiments.

The principle of a master brake cylinder in a tandem construction is illustrated in a highly simplified manner for visualization in FIG. 3.

A first piston 4 having the associated first piston spring 5, and a second piston 4' having the associated second piston spring 5', are disposed so as to be coaxially behind one another in the cavity 15 of the housing 2.

In one or more embodiments, it is permissible for only one of the assembly units 3, 3' or both assembly units 3, 3' to be designed and assembled according to the description above.

The embodiments provide that an assembly unit which comprises the piston and the piston spring is provided for assembling the piston having the piston spring in the apparatus. It is provided that the piston spring is configured from a magnetic or magnetizable material, for example a ferromagnetic material such a spring steel, and the piston is configured from a non-magnetic material such as plastics material or light metal. The piston spring in the assembly unit can thus be held on the piston by a magnetic field.

Pre-assembling is completely dispensed with or can at least be significantly reduced. A formation of swarf is precluded by dispensing with the press-fitting or riveting.

According to one or more embodiments, the magnetic field can be generated by a magnetic element which is disposed in an assembly tool which is to be removed after incorporating the assembly unit such that the piston when assembling is positioned and jammed between the magnetic element and the piston spring.

The requirement of precisely adapting and permanently fixing the piston spring to the piston is thus dispensed with. The assembly unit is only temporarily held together during the assembly procedure.

According to one or more embodiments, the piston is designed so as to be substantially sleeve-shaped having a base and a tubular wall, wherein an internal side of the wall and an internal side of the base in the piston delimit a piston interior space, and the piston spring at least in regions is disposed in the piston interior space.

Reliable guiding and establishing of the piston spring by way of a comparatively minor magnetic field and a magnetic element of reduced size is guaranteed on account thereof.

For further improving reliable linking of the piston spring, the magnetic element for assembling can preferably be positioned in the region of the external side of the base such that the piston spring is pressed against the internal side of the base by the magnetic field. The interface between the piston and the assembly tool can thus moreover be significantly simplified.

According to one or more embodiments, the piston spring is disposed in a functionally favorable manner so as to be coaxial with the piston.

For simple positive centering of the piston spring in relation to the piston, an appendage which projects into the piston interior space can be disposed on the internal side of the base, said appendage at least in regions having a conical external contour portion.

In order to effectively avoid tilting or canting of the piston spring relative to the piston, the piston spring can have a loose clearance fit in relation to the appendage as well as in relation to the wall of the piston.

The requirements in terms of the dimensional accuracy are thus moreover reduced; for example, for standardization a piston spring can advantageously be paired with a plurality of piston variants and vice versa. The diversity of parts, or the scope of parts, respectively, is reduced cost-effectively.

According to one or more embodiments, the magnetic element can be configured as a permanent magnet, on account of which the assembly tool can be constructed in a particularly simple manner and so as to be independent of an electric current.

According to another embodiment, the magnetic element can also be configured as a solenoid, the magnetic field of the latter being present in an activated state of the magnetic element and not being present or not being present to a sufficient extent in a deactivated state of the magnetic element. The assembly process can thus be designed in a particularly simple manner because the adhesion between the assembly unit and the assembly tool, and releasing said mutual adhesion, is capable of being implemented in a reliable and effective manner by simply actuating the solenoid.

The advantages are exploited in a particularly effective manner when the apparatus is configured as a master brake cylinder of a motor vehicle brake system, preferably in a tandem construction having two pistons which are disposed coaxially behind one another and have associated piston springs.

The embodiments also achieve effectively a simplified assembly tool for assembling the assembly unit, said assembly tool having an interface for physically linking the piston and at least one magnetic element in the region of the interface. The requirement of holding in place the piston by means of complex mechanical or pneumatic devices can be dispensed with or at least significantly simplified.

The embodiments furthermore relate to an advantageous assembly method for assembling the piston having the associated piston spring, said method comprising the following:

forming an assembly unit in that the piston conjointly with a piston spring which is spatially aligned with said piston is placed in a magnetic field of the assembly tool at a provided interface between the piston and the assembly tool; introducing the assembly unit into the cavity in the housing of the apparatus, and separating the assembly tool from the piston. The complex pre-assembly can be dispensed with by way of the advantageous assembly method, the overall complexity for assembling can be reduced on account thereof, and the assembly plants can be significantly simplified as well as standardized. A high degree of automation is likewise facilitated by the assembly method according to the invention.

LIST OF REFERENCE SIGNS

1 Apparatus
2 Housing
3 Bore
4 Piston
5 Piston spring
6 Assembly unit
7 Magnetic field
8 Magnetic element
9 Assembly tool
10 Base
11 Wall
12 Piston interior space
13 Appendage
14 External contour portion
15 Cavity
16 Interface
17 Slide
18 Sealing element

The invention claimed is:

1. An apparatus comprising:
a housing having a cavity therein and which at least in regions is configured as a bore in which at least one piston and one piston spring associated with the piston are received;
wherein the piston spring in the bore when activating the piston in the operation of the apparatus is compressed by the piston;
wherein an assembly unit which comprises the piston and the piston spring is provided for assembling the piston having the piston spring in the apparatus;
wherein the piston spring is configured from a magnetic or magnetizable material, the piston is configured from a non-magnetic material; and
wherein the piston spring in the assembly unit is held on the piston by a magnetic field.

2. The apparatus as claimed in claim 1, wherein the magnetic field is generated by a magnetic element which is disposed in an assembly tool, wherein the piston when assembling is positioned between the magnetic element and the piston spring.

3. The apparatus as claimed in claim 2, wherein the assembly tool is removed from the apparatus incorporating the assembly unit in the apparatus.

4. The apparatus as claimed in claim 1, wherein the piston is designed so as to be substantially sleeve-shaped having a base and a tubular wall, wherein an internal side of the wall and an internal side of the base in the piston delimit a piston interior space, and the piston spring at least in regions is disposed in the piston interior space.

5. The apparatus as claimed in claim 2, wherein the magnetic element for assembling is positioned in the region of the external side of the base such that the piston spring is pressed against the internal side of the base by the magnetic field.

6. The apparatus as claimed in claim 1, wherein the piston spring has a loose clearance fit in relation to the piston.

7. The apparatus as claimed in claim 1, wherein the piston spring is disposed so as to be coaxial with the piston.

8. The apparatus according to claim 4, wherein an appendage for centering the piston spring which projects into the piston interior space is disposed on the internal side of the base, wherein the appendage at least in regions possesses a conical external contour portion, and wherein the piston spring has a clearance fit in relation to the appendage.

9. The apparatus as claimed in claim 2, wherein the magnetic element is configured as a permanent magnet.

10. The apparatus as claimed in claim 2, wherein the magnetic element configured as a solenoid, the magnetic field of the latter being present in an activated state of the magnetic element and not being present or not being present to a sufficient extent in a deactivated state of the magnetic element.

11. The apparatus as claimed in claim 1, wherein the apparatus is designed as a master brake cylinder for a motor vehicle brake system.

12. The apparatus as claimed in claim 11, wherein the master brake cylinder is configured in a tandem construction having at least two first pistons which are disposed coaxially behind one another and have the associated first piston spring and second pistons having the associated second piston spring, wherein at least one piston having the associated piston spring is provided as the assembly unit.

13. The apparatus as claimed in claim 1, wherein the piston spring is configured from a ferromagnetic material.

14. An assembly tool for assembling a housing having a cavity therein and which at least in regions is configured as a bore in which at least one piston and one piston spring associated with the piston are received;
wherein the piston spring in the bore when activating the piston in the operation of the apparatus is compressed by the piston;
wherein an assembly unit which comprises the piston and the piston spring is provided for assembling the piston having the piston spring in the apparatus;
wherein the piston spring is configured from a magnetic or magnetizable material, the piston is configured from a non-magnetic material; and
wherein the piston spring in the assembly unit is held on the piston by a magnetic field, wherein the assembly tool for physically linking the piston to the assembly tool has an interface and at least one magnetic element in the region of the interface.

15. The method as recited in claim 14, wherein the piston spring is configured from a magnetic or magnetizable material, and the piston is configured from a non-magnetic material, the method further comprising:
forming an assembly unit in that the piston conjointly with a piston spring which is spatially aligned with said piston is placed in a magnetic field of the assembly tool at a provided interface between the piston and the assembly tool;
introducing the assembly unit into the cavity in the housing of the apparatus; and
separating the assembly tool from the piston.

16. The method as recited in claim 14, wherein the piston spring is configured from a magnetizable material.

17. The method as recited in claim 14, wherein the piston spring is configured from a ferromagnetic material.

* * * * *